United States Patent [19]

Nordsiek

[11] 3,937,681
[45] Feb. 10, 1976

[54] TIRE TREAD OF HOMOPOLYMERS OF BUTADIENE

[75] Inventor: Karl-Heinz Nordsiek, Marl, Germany

[73] Assignee: Chemische Werke Huels Aktiengesellschaft, Marl, Germany

[22] Filed: Dec. 20, 1974

[21] Appl. No.: 535,107

Related U.S. Application Data

[63] Continuation of Ser. Nos. 435,869, Jan. 23, 1974, and Ser. No. 304,598, Nov. 8, 1972, abandoned, and Ser. No. 8,745, Feb. 4, 1970, abandoned.

[30] Foreign Application Priority Data

Feb. 7, 1969 Germany............................ 1906037

[52] U.S. Cl.. 260/33.6 AQ; 152/330 R; 156/110 R; 156/128 T; 260/99.7 HA
[51] Int. Cl.$^2$.... B29H 5/02; B60C 5/00; C08K 5/01
[58] Field of Search 260/94.2 M, 33.6 AQ, 94.7 HA; 156/110 R, 128 T; 152/330 R

[56] References Cited

UNITED STATES PATENTS

| 3,060,989 | 10/1902 | Railsback et al. ................. 152/330 |
| 3,301,840 | 1/1967 | Zelinski........................ 260/94.2 M |
| 3,627,740 | 12/1971 | Schafer et al..................... 260/80.78 |
| 3,704,286 | 11/1972 | Schafer et al.................. 260/94.7 R |
| 3,741,927 | 6/1973 | Nordsiek et al. .................. 260/33.6 |
| 3,829,409 | 8/1974 | Sommer et al..................... 260/94.2 |

OTHER PUBLICATIONS

Duck et al. — IRI Journal—Oct. 1968, pp. 223–227.
Nordsiek—Kautschuk und Gummi.Kunststoffe, 25 (3), pp. 87–92, (Mar. 1972).
Railsback et al. — Phillips Petroleum Co., R. & D. Report, pp. 5944–5971, (1/28/71).
Oberster et al., (Firestone)—Paper given at GdCH–Fachgruppe "Makromoleculare Chemie," (Mar. 1972).
C & E News, p. 13, 6/24/74.
European Chemical News, p. 45, 6/7/74.
Railsback et al. — Blends of Medium Vinyl Polybutadienes with SBR Rubbers—pp. 1–3, (pub. date unknown).

*Primary Examiner*—Donald E. Czaja
*Assistant Examiner*—H. H. Fletcher
*Attorney, Agent, or Firm*—Millen, Raptes & White

[57] ABSTRACT

For facilitating the production of automotive tire treads of satisfactory abrasion and skid resistance, there is provided a composition consisting essentially of:

a. a polybutadiene containing 25–50% of monomer units arranged in the 1,2-position; 10–40% of 1,4-cis-double bonds; 15–55% of 1,4-trans-double bonds; and an ML-4 value of 40–120;
b. 5–100 parts by weight of a plasticizer oil; and
c. 30–120 parts by weight of a carbon black.

10 Claims, No Drawings

TIRE TREAD OF HOMOPOLYMERS OF BUTADIENE

This is a continuation, of application Ser. No. 435,869 filed 1-23-74; Ser. No. 304,598 filed 11-8-72; and Ser. No. 8,745 filed 2-4-70 all now abandoned.

BACKGROUND OF THE INVENTION

This invention relates to novel rubbery compositions, and in particular to tire treads wherein homopolymers of polybutadiene are the essential rubbery polymers.

Conventional automotive tire treads are based on vulcanizates of rubber blends filled with large amounts of oil and carbon black. As the rubber blends, there have been employed mixtures of copolymers of butadiene and styrene (SBR) with stereoregular polydiolefins (DR), preferably cis-1,4-polybutadiene prepared by emulsion or solution polymerization. The blending weight ratio, in this process of SBR : DR normally varies between 80 : 20 and 50 : 50 respectively. If the proportion of stereospecific polydiolefins is increased, the tread life is increased, but conversely, the tread skid resistance on wet roads is impaired. Consequently, from the standpoint of safety, manufacturers have been forced to accept only a limited usage of the more durable stereospecific polydiolefins. Aside from skid resistance, another problem associated with the exclusive use of the previously known homopolybutadienes, is the substantial difficulty in processing the formulations containing said homopolymers.

As a result of the above problems, it has been considered essential, heretofore, to employ the above-mentioned blends, and to tailor the composition of the blends to the respective requirements. However, the use of these blends, as compared for example, to a single polymer, involves more complex and expensive manufacturing operations. Furthermore, off-grade products and operational problems are encountered which often result from the fact that the blend components, which differ in their chemical constitution from one another, are very difficult to distribute homogeneously. Because of this blending problem and the relatively expensive manufacture of these blends, there has been a continuing need and significant interest in finding new polymers which would exhibit the same compromise in properties as the vulcanized blends, but which would be amenable to easier and more economical processing conditions.

Therefore, substantial research has already been conducted to provide improved polymeric systems for tire tread. Thus, it has been determined that elastomeric properties which are usable in certain respects are exhibited not only by homopolymers of diolefins having high contents of 1,4-cis-structure, particularly 1,4-cis-polybutadiene, but also by homopolymers having very high contents (above 50%) of monomer units disposed in the 1,2-position. Specifically, E. W. Duck and J. M. Lock (Jour. I.R.I. 2 (1968), p. 223) discovered that polybutadienes containing more than 50% of monomer units arranged in the 1,2-position do not exhibit any cold flow and have a higher building tack than other polymers and, furthermore, by and large have very useful rubbery properties. Unfortunately, however, these polybutadienes, having above 50% of monomer units disposed in the 1,2-position, exhibit an abrasion resistance which is clearly inferior to that of the standard SBR-types and especially to that of blends of SBR with cis-1,4-polybutadiene.

SUMMARY OF THE INVENTION

An object of this invention, therefore, is to provide an improved polymeric system for the production of tire tread, and especially a system which is readily and economically processable.

Upon further study of the specification and appended claims, other objects and advantages of the present invention will become apparent.

To attain these objects, there are provided compositions for the manufacture of tire treads based on homopolybutadiene, said compositions comprising:

a. a rubbery component consisting essentially of a polybutadiene containing 25–50%, preferably 30–45%, of monomer units arranged in the 1,2-position; 10–40%, of 1,4-cis-double bonds; 15–55% of 1,4-trans-double bonds; and an ML-4 value of 40–120;

b. about 5–100 parts by weight of a plasticizer, based on 100 parts by weight of polybutadiene;

c. about 30–120 parts by weight of a carbon black, based on 100 parts by weight of polybutadiene.

In accordance with an especially advantageous embodiment of the present invention, the treads on the basis of polybutadiene-plasticizer-filler mixtures in automobile tires further comprise as an additional component d. a vulcanization system containing about 1–3 parts by weight of sulfur and preferably 0.5–2.5 parts by weight of mercaptobenzothiazole or derivatives thereof, especially the sulfenamides thereof.

DETAILED DISCUSSION OF THE INVENTION

A particularly pressing need is now satisfied by the production of tire treads on the basis of stereoregular Lomopolybutadiene with a content of 25–50%, preferably 30–45%, of monomer units disposed in the 1,2-position — namely to avoid the process and product "bugs" inherent in the production of the composite blends which are generally employed today. Whereas the ratio of cis to trans structure is normally in the range of 10 : 55 to 40 : 15, it is preferably in the range of 20 : 45 to 35 : 20.

These polybutadienes employed according to this invention, in a mixture with plasticizers and carbon black, are much more readily processable as compared to the conventional polybutadienes having a high proportion of monomer units in the 1,4-position, and result in treads with favorable skid resistance properties on wet roads, and with rubber properties which otherwise meet the conventional requirements for automobile tires.

The polybutadienes containing 25–50% of monomer units arranged in the 1,2-position, as manufactured and used in accordance with this invention, are produced in organic solvents with organo-lithium compounds as catalysts and with the addition of polar compounds, such as, for example, ethers, amines, phosphines, or dialkyl or diaryl sulfides of a specific composition.

In this connection, examples of suitable lithium compounds are n-butyllithium, isobutyllithium, methyllithium, or phenyl-lithium.

Suitable ethers are compounds of the general formulae R—O—R, R'—O—R, or R'—O—R—O—R', R'λ'—O—R—O—R', wherein R, R' and R" represent aliphatic or cycloaliphatic residues of 1–20 carbon atoms and aromatic residues of 6–14 carbon atoms.

Particularly suitable are dimethyl ether, diethyl ether, diphenyl ether, tetrahydrofuran, dioxane, 1,2-dimethoxymethane, and 1,2-dimethoxyethane.

Suitable amines include primary, secondary, and tertiary amines of 3-20 carbon atoms with the latter being the preferred type. Suitable phosphines are, in particular, compounds of the type of triphenylphosphine.

The polymerization is conducted in the presence of aliphatic solvents, such as hexane and cyclohexane, preferably hexane, and aromatic solvents, such as benzene and toluene, preferably benzene. The solvents may be used alone or as mixtures.

The polymerization temperatures are 30° to 150°C. The catalyst system consists of 0.01 to 0.1 % by weight of lithium organic compounds and 0.01 to 10 % of a Lewis base, both percentages are based on the amount of butadiene.

The weight ratios of Lewis base to lithium organic compounds are between 0.1 : 1 to 100 : 1.

A further advantage of the polybutadienes employed in accordance with this invention resides in the possibility of employing larger amounts of plasticizer and carbon black. Suitable plasticizers are all aliphatic or aromatic oils conventionally employed in rubber processing. These oils are employed in amounts of 5-100 parts by weight, preferably 40-70 parts by weight, based on 100 parts by weight of polybutadiene. For a more detailed description of such plasticizers, attention is invited to H. A. Munderloh, Kautschuk und Gummi 12 (1959), page WT 246 - 256.

Especially suitable fillers are highly active carbon blacks, such as HAF (high abrasion furnace), ISAF (intermediate super abrasion furnace), SAF (super abrasion furnace) — also optionally in combination with light-colored fillers. They are employed in amounts of 30-120 parts by weight, especially 70-100 parts by weight, based on 100 parts by weight of polybutadiene. In this connection, the quantities of filler and plasticizer must always be in meaningful relationships with respect to each other. Good processing characteristics are always obtained with a filler : plasticizer ratio of about 1 : 1 to 10 : 1.

In order to manufacture the tire treads, the polybutadienes employed according to this invention are homogeneously mixed with the required amounts of plasticizer or oil, in accordance with conventional methods and under gentle conditions. Then, in processes and devices which are likewise conventional, these mixtures are extruded, after the addition of customary auxiliary agents employed with rubber mixtures, into tire tread strips. These tread strips are then vulcanized, together with the other tire components customary in the tire manufacture, such as sidewalls and carcasses, in likewise conventional presses.

In accordance with a special embodiment of the present invention, the starting material is a polybutadiene containing 25-50%, preferably 30-45% of monomer units disposed in the 1,2-position, and this polymer is reacted, subsequent to the polymerization and prior to the production of tread strips, with "molecular weight jump" catalyst systems of, for example, compounds containing active hydrogen or being proton-active in combination with organoaluminum compounds, in order to increase the molecular weight. With respect to additional details of the so-called "molecular weight jump," reaction and catalysts attention is directed, in particular, to the work of E. F. Engel, J. Schäfer, and K. M. Kiepart in "Rubber and Plastics Age" 45 (1964), pp. 1499 et seq, as well as to corresponding U.S. Pats. 3,627,740 and 3,704,286 by one or more of the authors on this subject.

In addition to increasing the molecular weight by the "molecular weight jump" in the presence of these catalyst systems, it is also advantageous to make use of the so-called "coupling reaction" of lithium polymers in the presence of compounds such as, for example, methylene chloride, chloroform, particularly silicon tetrahalides, and carbon tetrachloride, reference being invited to U.S. Pat. No. 3,244,664 for further details. In addition thereto, other processes for increasing the molecular weight, for example with the use of sulfur halogenides, particularly disulfur dichloride, can be employed with equal success (DAS [German Published Application] No. 1,260,794).

In this connection, the 1,2-polybutadiene which is to be formed into the tire tread generally has an ML-4 value of 40-120. The rubber before any molecular weight jump step usually has an ML-4 value of 10-60, which can then be increased to 70-120 under the conditions of the above-described processes for increasing the molecular weight. To obtain the optimum effect in accordance with the invention, the process for increasing the molecular weight can take place in the presence or absence of the additives. By conducting the reaction in the presence of a plasticizer, the intended viscosities of the polymer-plasticizer-mixtures are obtained immediately. Regarding the description of plasticizers see page 5, line 10.

As a further advantageous embodiment of the present invention, a vulcanization system is employed comprising 1-3 parts by weight of sulfur and 0.5-2.5 parts by weight of an accelerator, especially mercaptobenzothiazole or the derivatives thereof, particularly the sulfenamides thereof. In addition thereto, there can also be employed secondary accelerators such as dithiocarbamate, thiurame, aldehydamine and guanidine (Boström, Kautschuk-Handbuch, Verlag Berliner Union — Stuttgart, Vol. IV, pages 307-323).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

All parts in the examples as well as in the other parts of the disclosure are on a weight basis unless otherwise specified.

EXAMPLE 1

A stirred vessel is filled under exclusion of air and humidity with 80 parts by weight of benzene, 20 parts by weight of butadiene-1,3 and 0.8 parts by weight of diethyl ether, the parts by weight are based on the amount of butadiene-1,3 used. After heating the mixture to 49°C 0.025 % by weight of lithium butyl, based on the amount of butadiene-1,3 used, are added. The temperature is maintained at 49°C by cooling. After 4 hours the reaction is finished.

The resultant polymer, after reaching a Mooney viscosity (ML-4 100° C.) of about 40, is mixed with ¼ of an equivalent of silicon tetrachloride, based on the butyllithium. After raising the Mooney viscosity to the value of 90 due to the "coupling reaction" taking place during this step, the polymerization reaction is stopped in a conventional manner, by the addition of methanol. The polymer, present in solution, exhibits the following microstructure:

| Arrangement of the Monomer Units | | |
|---|---|---|
| 1,4-Trans | 1,4-Cis | 1,2 |
| 47% | 24% | 29% |

Thereafter, to this polymer solution are added 37.5 parts by weight of a plasticizer (based on 100 parts by weight of dry polybutadiene), having a high content of aromatics, specifically Naftolen NV.

The subsequent processing of the polymer takes place by separating the solvent with steam, and dewatering by treatment in screw extruders and dryers.

During the course of further processing, the following mixture is thereafter prepared with the aid of an internal mixer such as a Banbury mixer.

| | |
|---|---|
| Oil extended rubber | 137.5 Parts |
| Stearic acid | 2.5 Parts |
| Zinc oxide | 4.0 Parts |
| HAF Carbon black | 70.0 Parts |
| Coumarone resin | 3.0 Parts |
| Aromatic plasticizer oil | 2.5 Parts |
| Phenyl-β-naphthylamine | 1.0 Parts |

The mixture is then stored for 6 hours at room temperature to get lower temperatures of the mixture.

Thereafter, the following components are admixed thereto on a rolling mill at 50° C.;

| | |
|---|---|
| Sulfur | 2.2 Parts |
| Mercaptobenzothiazole sulfonamide | 1.2 Parts |

In order to determine the physical data, a stepwise heating procedure is conducted at 143° C. (15, 30, 60, and 90 minutes), with the following results as set forth in Table 1:

TABLE 1

| Heating Time Minutes | Tensile Strength kg/cm² | Elongation % | Modulus 300 % | Hardness ° Shore | Rebound Elasticity% 22° C. | 75° C. | Abrasion DIN | Pico | Skid Resistance Wet Concrete |
|---|---|---|---|---|---|---|---|---|---|
| 15' | 135 | 412 | 67 | 59 | 26 | 52 | 115 | 27 | 44 |
| 30' | 144 | 396 | 84 | 59 | 28 | 53 | 93 | 25 | 43 |
| 60' | 138 | 420 | 98 | 61 | 26 | 52 | 95 | 25 | 44 |
| 90' | 132 | 408 | 96 | 60 | 26 | 52 | 96 | 25 | 45 |
| Under the conditions of the same vulcanization recipe, the following result is obtained for a blend of OE-BR* and OE-SBR** in a ratio of 50:50 | | | | | | | | | |
| 15' | 164 | 390 | 70 | 60 | 35 | 51 | 120 | 27 | 45 |
| 30' | 183 | 374 | 98 | 60 | 34 | 52 | 105 | 26 | 45 |
| 60' | 174 | 398 | 104 | 61 | 35 | 52 | 100 | 28 | 46 |
| 90' | 170 | 401 | 97 | 60 | 35 | 50 | 102 | 27 | 43 |

*OE-BR is oil extended butadiene rubber having 37.5 parts by weight of the total rubber, an oil identical to said plasticizer
**OE-SBR is oil extended styrene-butadiene rubber having 37.5 parts by weight of the total rubber, an oil identical to said plasticizer The unvulcanized mixtures are then conventionally shaped into tread strips which, in turn, are employed for producing an automobile tire having the dimension of 6.40 — 13. The vulcanization is conducted in a tire heater for 30 minutes at 165° C.

On an automobile run of about $10^4$ km., the resistance of the treads to wear under practical conditions is determined.

In a comparison with the tread from the blend of OE-BR/OE-SBR = 50/50, the tread of polybutadiene with a proportion of 29% of monomer units arranged in the 1,2-position, yields the following result:

| | |
|---|---|
| Abrasion Index | |
| Treads of the blend OE-BR/OE-SBR = 50/50 | = 100 |
| Treads of oil-extended polybutadiene with a 29% 1,2-proportion | = 104 |

This proves the substantial equality, if not improvement in the properties of the homopolybutadiene with the above-described molecular structure. Consequently, such homopolymers can be processed in less troublesome and more economical manner than the blends: the advantages of the present invention are readily apparent.

EXAMPLE 2

One hundred parts of polybutadiene produced according to Example 1, but with the use of hexane as the solvent and 1% of tetrahydrofuran in place of the diethyl ether, is mixed, after raaching a Mooney viscosity of 40 and after the addition of 37.5 parts of oil having a high content of aromatics (based on the polymer), with 0.5% of disulfur dichloride (based on the polymer), and treated in the original solution until a Mooney value of 40 is reached for the oil-extended rubber.

After the solvent has been removed by means of steam, pressing, and drying of the crumbs, a gel-free polymerized product is obtained having the following microstructure:

| Arrangement of the Monomer Units | | |
|---|---|---|
| 1,4-Trans | 1,4-Cis | 1,2 |
| 39% | 23% | 38% |

Further processing into tire treads is conducted according to the following vulcanization recipe:

| | |
|---|---|
| Oil extended rubber | 137.5 Parts |
| Coumarone resin | 3.0 Parts |
| Zinc oxide | 3.0 Parts |
| Stearic acid | 2.0 Parts |
| Phenyl-β-naphthylamine | 1.5 Parts |
| ISAF Carbon black | 85.0 Parts |
| Aromatic plasticizer oil | 15.0 Parts |
| Sulfur | 1.5 Parts |
| Mercaptobenzothiazole sulfenamide | 2.0 Parts |

In order to determine the physical data, a stepwise heating procedure is conducted at 151° C. (10, 20, 30, 40 minutes), with the following results as seen in Table 2:

TABLE 2

| Heating Time Minutes | Tensile Strength kg/cm² | Elongation % | Modulus 300% | Hardness ° Shore | Rebound Elasticity % 22° C. | Rebound Elasticity % 75° C. | Abrasion DIN | Abrasion Pico | Skid Resistance Wet Concrete |
|---|---|---|---|---|---|---|---|---|---|
| 10' | 141 | 600 | 56 | 59 | 28 | 48 | 150 | 30 | 46 |
| 20' | 150 | 501 | 89 | 60 | 29 | 51 | 130 | 25 | 44 |
| 30' | 138 | 486 | 86 | 60 | 28 | 51 | 128 | 26 | 44 |
| 40' | 141 | 493 | 83 | 60 | 28 | 51 | 127 | 25 | 46 |

Under the same conditions, the following result is obtained for the vulcanizate produced on the basis of the same vulcanization recipe of a blend of OE-SBR/OE-BR=82.5/55, wherein SBR/BR are contained in a ratio of 60:40

| Heating Time Minutes | Tensile Strength kg/cm² | Elongation % | Modulus 300% | Hardness ° Shore | Rebound Elasticity % 22° C. | Rebound Elasticity % 75° C. | Abrasion DIN | Abrasion Pico | Skid Resistance Wet Concrete |
|---|---|---|---|---|---|---|---|---|---|
| 10' | 161 | 615 | 58 | 59 | 30 | 48 | 141 | 31 | 48 |
| 20' | 170 | 525 | 82 | 60 | 30 | 50 | 135 | 25 | 47 |
| 30' | 169 | 520 | 81 | 60 | 30 | 50 | 135 | 25 | 47 |
| 40' | 171 | 525 | 81 | 60 | 30 | 49 | 130 | 25 | 47 |

The mixtures are processed, analogously to Example 1, into tread strips which, in turn, are employed for the manufacture of automobile tires having the dimension of 6.40 — 13.

After conducting an automobile run over about 10,000 km., there are obtained the following comparative results:

Abrasion Index

| | |
|---|---|
| Tread of a blend of OE-SBR/OE-BR = 82.5/55 | = 100 |
| Tread of oil-extended polybutadiene with a 38% 1,2-proportion | = 99 |

Thus, it is shown that the ultimate properties of the homopolybutadiene with the above-described structural characteristics are substantially equal to a currently widely used blend.

EXAMPLE 3

A butadiene polymer produced in accordance with Example 2 is mixed, after reaching a Mooney viscosity of 45 per 100 g. of polymer, with 25 millimols of diethyl aluminum monochloride and 2.3 millimols of tert.-butyl chloride. After the jump-like increase in the Mooney value was practically terminated, 37.5 parts of oil is added, analogously to Example 1, and the mixture is processed to a solid rubber having an ML-4 value of 37. The microstructure of the polymer contained therein is as follows:

Arrangement of the Monomer Units

| 1,4-Trans | 1,4-Cis | 1,2 |
|---|---|---|
| 40% | 23% | 37% |

Further processing into tire treads takes place according to the vulcanization recipe described in Example 2.

Stepwise heating at 151° C. (10, 20, 30, 40 minutes) leads to the following results as shown in Table 3:

Both vulcanizates are once again tested in an automobile run, side-by-side, with respect to their efficiency as tread material for automobile tires. Result:

Abrasion Index

| | |
|---|---|
| Tread of OE-SBR/OE-BR = 82.5/55 | = 100 |
| Tread of the oil-extended polybutadiene described herein with a 37% 1,2-proportion | = 102 |

This once again demonstrates the substantial equality of the butadiene polymers of this invention as tire rubber as compared to blends of SBR and BR produced in accordance with the state of the art.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A vulcanizable composition shaped into tire tread strip form, consisting essentially of
    a. 100 parts by weight of a polybutadiene consisting of 25–50% monomer units arranged in the 1,2-position; 10–40% monomer units arranged in the 1,4-cis position; and correspondingly 15–55% monomer units arranged in the 1,4-trans position, the ratio of cis to trans structures being 10:55 to 40:15, said polybutadiene having an ML-4 100°C. value of 70–120 and being prepared by subjecting a lithium polymerized polybutadiene having an ML-4 100°C. value of 10–60 to a molecular weight jump or coupling reaction to increase the molecular weight thereof;
    b. 5–100 parts by weight of a plasticizer oil; and
    c. 30–120 parts by weight of a carbon black filler.

TABLE 3

| Heating Time Minutes | Tensile Strength kg/cm² | Elongation % | Modulus 300% | Hardness ° Shore | Rebound Elasticity % 22° C. | Rebound Elasticity % 75° C. | Abrasion DIN | Abrasion Pico | Skid Resistance Wet Concrete |
|---|---|---|---|---|---|---|---|---|---|
| 10' | 135 | 615 | 53 | 60 | 28 | 46 | 156 | 32 | 44 |
| 20' | 146 | 525 | 91 | 61 | 27 | 52 | 128 | 28 | 44 |
| 30' | 140 | 530 | 93 | 60 | 27 | 51 | 131 | 25 | 44 |
| 40' | 132 | 480 | 88 | 60 | 27 | 51 | 124 | 25 | 43 |

As a comparison with the state of the art, the vulcanizate of a blend of OE-SBR/OE-BR = 82.5/55 is once again employed (for the results, see Example 2).

2. A composition as defined by claim 1 wherein the filler : plasticizer ratio is about 1:1 to 10:1.

3. A composition as defined by claim 2, further comprising a vulcanization system containing 1–3 parts by weight of sulfur and 0.5–2.5 parts by weight of an accelerator.

4. A composition as defined by claim 3 wherein said accelerator is a mercaptobenzothiazole.

5. A vulcanized tire tread prepared by vulcanizing the composition of claim 3.

6. A composition as defined by claim 1, comprising
   a. said polybutadiene consisting of 30–45% monomer units arranged in the 1,2-position wherein the ratio of cis to trans structures is 20:45 to 35:20;
   b. 40–70 parts by weight of said plasticizer oil; and
   c. 70–100 parts by weight of said filler.

7. A composition as defined by claim 6 wherein the filler: plasticizer ratio is about 1:1 to 10:1.

8. A composition as defined by claim 7, further comprising a vulcanization system containing 1–3 parts by weight of sulfur and 0.5–2.5 parts by weight of an accelerator.

9. A composition as defined by claim 8 wherein said accelerator is a mercaptobenzothiazole.

10. A vulcanized tire tread prepared by vulcanizing the composition of claim 9.

* * * * *